Patented Nov. 17, 1931

1,832,594

UNITED STATES PATENT OFFICE

SIDNEY THORNLEY, OF BLACKLEY, MANCHESTER, ENGLAND, ASSIGNOR TO BRITISH DYESTUFFS CORPORATION LIMITED, OF MANCHESTER, ENGLAND

BLACK AND GREY VAT DYES

No Drawing. Application filed July 9, 1928, Serial No. 291,503, and in Great Britain July 15, 1927.

In my specification Serial No. 193,378 dated 21st May 1927, I have described the manufacture of new vat dyestuffs dyeing black and grey shades of excellent fastness, by treating with hydroxylamine or a salt thereof, in the presence or absence of ferrous sulphate, the vat dyes obtained by alkali fusion of benzanthrone sulphonic acids obtained by the direct sulphonation of benzanthrone, as described in specification Serial No. 193,375 dated 21st May 1927 (Baddiley, Shepherdson and Thornley).

I have now found that new vat dyestuffs having properties similar to these can be obtained by treating in the same manner the vat dyes obtained by alkali fusion of sulphonic derivatives of substituted benzanthrone bodies obtained by the direct sulphonation of a substituted benzanthrone body. By the term substituted benzanthrone body I mean both the homologues and derivatives of benzanthrone, for instance the methyl and chloro benzanthrones, as described in the specification of British application No. 18943/27 of the patent of addition to British Patent No. 276,766 (U. S. A. Serial No. 193,375).

Likewise sulphonic derivatives of substituted benzanthrone bodies prepared by synthesis from suitable sulphonic derivatives of anthraquinone bodies and glycerol may be converted by alkaline fusion into vat dyestuffs which similarly yield new vat dyestuffs by condensation with hydroxylamine.

*Example 1. Condensation of the alkaline fusion product of sulphonated chlorobenzanthrone with hydroxylamine*

1 part of the alkaline fusion product of sulphonated chlorobenzanthrone is dissolved by stirring for ½ hour at 100° C. in 20 parts of concentrated sulphuric acid 66° Bé. The solution is cooled, 1.2 parts of ferrous sulphate crystals added and then 0.5 part of hydroxylamine hydrochloride gradually added. The mixture is heated to 165–170° C. and kept at this temperature for 2 hours. After cooling, the reaction mixture is poured into 200 parts of water and the whole boiled and filtered hot. The residual cake of dyestuff is washed free from acid with water and dried. The dyestuff so obtained gives a royal blue vat with alkaline hydrosulphite, which dyes cotton in greyish-blue shades. The dyestuff is a blue-black powder, dissolving in concentrated sulphuric acid giving a grey-olive solution and being insoluble in pyridine, aniline or nitrobenzene.

*Example 2. Condensation of the alkaline fusion product of sulphonated methyl-benzanthrone with hydroxylamine*

2 parts of the alkaline fusion product of sulphonated methyl-benzanthrone are dissolved by stirring for 1½ hours at 100° C. in 40 parts of concentrated sulphuric acid. The solution is cooled, 2.4 parts of ferrous sulphate crystals added and then 1 part of hydroxylamine hydrochloride gradually added. The mixture is heated to 165–170° C. and kept at this temperature for 2 hours. After cooling the reaction mixture is poured into 400 parts of water and the whole boiled and filtered hot. The residual cake of dyestuff is washed free from acid with water and dried. The dyestuff so obtained gives a bluish-black vat with alkaline hydrosulphite dyeing cotton in grey shades. The dyestuff is a blue-black powder dissolving in concentrated sulphuric acid giving a brown-black solution, and being insoluble in pyridine, aniline or nitrobenzene.

The vat dyestuffs obtained by the alkaline fusion of sulphuric derivatives of substituted benzanthrone bodies contain hydroxyl groups, that is they are hydroxylated compounds. It appears that during the alkaline fusion the sulphuric groups are removed and replaced by hydroxyl groups. These hydroxylated vat dyes obtained from the alkaline fusion are distinctively sensitive to acids and alkalies. The treatment with hydroxylamine as hereinbefore disclosed converts these vat dyestuffs into new vat dyestuffs which are not sensitive to acid and alkali. Consequently the shade produced on cotton by my new vat dyestuffs have a much increased fastness to acids and alkalies. My new dyestuffs are probably hydroxylated amidated dibenzanthrones containing further substituent groups for instance methyl or chlorine.

What I claim and desire to secure by Letters Patent is:—

1. In the manufacture of new vat dyes, the process which comprises condensing hydroxylamine with the products obtainable by the alkaline fusion of sulphonated benzanthrone compounds of the class consisting of sulphonated alkyl-benzanthrone and sulphonated halogenated benzanthrone.

2. In the manufacture of new vat dyes, the process which comprises condensing hydroxylamine with the products obtainable by the alkaline fusion of sulphonated benzanthrone compounds of the class consisting of sulphonated methyl-benzanthrone and sulphonated chlorobenzanthrone.

3. In the manufacture of new vat dyes, the process which comprises condensing hydroxylamine with the products obtained by the alkaline fusion of a sulphonated alkyl benzanthrone.

4. In the manufacture of new vat dyes, the process which comprises condensing hydroxylamine with the products obtained by the alkaline fusion of a sulphonated methyl benzanthrone.

5. Vat dyestuffs obtained by condensing hydroxylamine in the presence of ferrous sulphate with the alkaline fusion products of the sulphonated benzanthrone compounds of the class consisting of sulphonated alkyl-benzanthrone and sulphonated halogenated benzanthrone, the said dyestuffs being blue-black powders, soluble in concentrated sulphuric acid and being practically insoluble in nitrobenzene, aniline or pyridine and giving vats with alkaline hydrosulphite from which cotton is dyed in grey to greyish-blue shades.

6. Vat dyestuffs obtained by condensing hydroxylamine in the presence of ferrous sulphate with the alkaline fusion products of sulphonated alkyl-benzanthrone, the said dyestuffs being blue-black powders dissolving in concentrated sulphuric acid, and being practically insoluble in nitrobenzene, aniline or pyridine, and giving vats with alkaline hydrosulphite from which cotton is dyed in greyish-blue shades.

7. Vat dyestuffs obtained by condensing the alkaline fusion products of sulphonated methyl benzanthrone with hydroxylamine in the presence of ferrous sulphate, the said dyestuffs being blue-black powders, dissolving in concentrated sulphuric acid with a grey-olive color and being practically insoluble in nitrobenzene, aniline or pyridine, and giving vats with alkaline hydrosulphite from which cotton is dyed in greyish-blue shades.

8. In the manufacture of new dyes, the process which comprises condensing a hydroxylamine material of the class consisting of hydroxylamine and salts of hydroxylamine, with a sulphonated benzanthrone compound of the class consisting of sulphonated chlorobenzanthrone and sulphonated methyl-benzanthrone.

9. The process of claim 8 in which the hydroxylamine material is hydroxylamine hydrochloride.

10. The process of claim 8 in which the sulphonated benzanthrone compound is sulphonated methyl-benzanthrone.

11. The process of claim 8 in which the sulphonated benzanthrone compound is sulphonated chlorobenzanthrone.

12. The process of claim 8 in which the condensation is effected in the presence of ferrous sulphate.

13. Vat dyestuffs obtained by condensing hydroxylamine in the presence of ferrous sulphate with the alkaline fusion products of sulphonated halogenated benzanthrones, the said dyestuffs being blue-black powders, soluble in concentrated sulphuric acid and being practically insoluble in nitrobenzene, aniline or pyridine and giving vats with alkaline hydrosulphite from which cotton is dyed in grayish-blue shades.

14. Vat dyestuffs obtained by condensing hydroxylamine in the presence of ferrous sulphate with the alkaline fusion products of sulphonated chlorobenzanthrone, the said dyestuffs being blue-black powders, soluble in concentrated sulphuric acid and being practically insoluble in nitrobenzene, aniline or pyridine and giving vats with alkaline hydrosulphite from which cotton is dyed in gray to grayish-blue shades.

In testimony whereof I affix my signature.

SIDNEY THORNLEY.